United States Patent [19]
Jasinski

[11] 3,928,050
[45] Dec. 23, 1975

[54] COLORED GLASS COMPOSITIONS
[75] Inventor: John Jasinski, Toledo, Ohio
[73] Assignee: Owens-Illinois, Inc., Toledo, Ohio
[22] Filed: Mar. 1, 1973
[21] Appl. No.: 337,168

Related U.S. Application Data
[63] Continuation-in-part of Ser. No. 239,725, March 30, 1972, Pat. No. 3,844,796, which is a continuation-in-part of Ser. No. 883,317, Dec. 8, 1969, abandoned.

[52] U.S. Cl. ................ 106/52; 106/48; 106/53; 106/54
[51] Int. Cl.² ................ C03C 3/04; C03C 3/24
[58] Field of Search ................ 106/52, 53, 54, 48; 65/121

[56] References Cited
UNITED STATES PATENTS

| | | | |
|---|---|---|---|
| 1,411,134 | /1922 | Taylor | 106/53 |
| 2,923,636 | 2/1960 | Swain | 106/52 |
| 3,024,120 | 3/1962 | Babcock | 106/52 |
| 3,024,121 | 3/1962 | Hagedorn | 106/52 |
| 3,364,041 | 1/1968 | Swain et al. | 106/48 |
| 3,364,042 | 1/1968 | Swain et al. | 106/48 |
| 3,482,955 | 12/1969 | Monks | 106/52 X |
| 3,545,952 | 12/1970 | Conrad | 65/121 |

OTHER PUBLICATIONS

Weyl, W. — Colored Glasses (1951) Sheffield, Eng., pp. 116–117, 136–137.
Norton; F. H. — Elements of Ceramics (1952) Cambridge, Mass., p. 199.

*Primary Examiner* — Patrick P. Garvin
*Assistant Examiner* — Mark Bell
*Attorney, Agent, or Firm* — Richard B. Dence; E. J. Holler

[57] ABSTRACT

Champagne green glass compositions based on the soda-lime-silica system containing chrome and manganese and cobalt which act together to produce a desired deep coloration in the glass. The chrome functions to maintain the manganese in its highest oxidation valence state.

4 Claims, No Drawings

3,928,050

COLORED GLASS COMPOSITIONS

REFERENCE TO RELATED APPLICATIONS

The present application is a continuation-in-part of my copending application, Ser. No. 239,725, filed in the Patent Office on Mar. 30, 1972, now U.S. Pat. No. 3,844,796, which in turn is a continuation of my copending application Ser. No. 883,317, filed Dec. 8, 1969, and now abandoned, the entire disclosures of both of the foregoing applications being relied on herein.

BACKGROUND OF THE INVENTION

The present invention relates to new colored glasses, more particularly, glasses which are based on the soda-lime-silica glass system and which are colored Champagne Green. According to the present invention there are provided novel glasses of a selected color formed by intimately and homogeneously blending selected ingredients to produce Champagne Green colored glass compositions.

In the past, colored glasses were often hard to produce and economically impracticable because of utilization of costly glass making ingredients and because of difficulties encountered in melting and forming the glasses. This was particularly true with respect to the making of Champagne Green glasses utilizing the costly and critical nickel colorant ingredient nickel oxide. Further, some prior known colored glasses were often faded in appearance or lacked the distinct and desired shade and hue for successfully manufacturing articles of commerce.

Now in accordance with the present invention, selected glass forming ingredients are used to form glass of a selected color range known as Champagne Green which is stable and distinct. The glasses of this invention lend themselves successfully to the manufacture of glassware and are particularly suitable for the fabrication of beverage containers. Further, the selected glass forming ingredients including colorants may be intimately and homogeneously blended together, melted and formed into articles using conventional glass forming apparatus. Because of these advantages of the present invention, the colored glasses provided thereby are economically utilizable and practicable for many commercial endeavors.

In the past, a number of methods have been suggested for the formation of Champagne Green glasses. Many of these methods involved the use of nickel oxide as a critical and essential ingredient in obtaining the desired Champagne Green coloration. For example, U.S. Pat. No. 3,024,120, issued to Babcock, discloses that nickel oxide is present in the amount of 0.04 to 0.06% by weight.

Ideally, Champagne Green glasses should possess certain optical standards. These optical standards may be best expressed in terms of the C.I.E. colormetric values based on the C.I.E. chromaticity diagram. C.I.E. refers to the First International Commission on Illumination and the diagram from which the values are taken defines color in terms of mixtures of theoretical color lights. The C.I.E. system makes possible the exact specification of colors by means of a "color map." The C.I.E. system of color notations specifies the color of glasses in terms of brightness, color, purity and dominant wave length.

"Brightness" which is usually expressed in terms of percentage, is the amount of visual response to a normal observer to the radiation emergent from a transparent object relative to the response in this observer to the radiation incident upon this object. Thus brightness may be briefly termed the lightness of color of an object.

"Purity" which is also normally expressed in terms of percentage is a measure of the monochromaticness of a color with monochromatic light having a purity of 100%. By diluting the monochromatic radiation with white light made up of all wave lengths, we thereby dilute the color and reduce purity.

"Dominant Wave Length" (DWL) usually expressed in millimicrons ($m\mu$) is the wave length of monochromatic light appearing to the eye to have the same hue as the mixed light actually encountered.

With particular respect to Champagne Green glasses, these optical standards, as represented by ten millimeters (mm) thickness of such Champagne green glasses, are set forth below:

| | |
|---|---|
| DWL ($m\mu$) | 560 to 564 |
| Purity (%) | 40 to 50 |
| Brightness (%) | 12 to 20 |

It is recognized of course that glasses falling outside these ideal optical standards would be acceptable for many purposes.

SUMMARY OF THE INVENTION

It is accordingly an object of the present invention to provide Champagne Green glass compositions which eliminate the need for employing nickel oxide as a colorant ingredient.

It is a further object of the present invention to provide a colorant oxide mixture suitable for use in coloring a base glass in order to produce a composite glass of uniform coloration having the characteristics of Champagne Green glass.

In attaining the objects of the present invention, one feature resides in employing a colorant oxide mixture containing chromium oxide, manganese oxide and cobalt oxide in specified amounts.

Another feature of the invention resides in forming Champagne Green glasses from soda-lime-silicate glasses wherein chrome is introduced to maintain another colorant, namely, manganese in its highest valence state where its coloring power is at a maximum.

Other objects, features and advantages of the invention will become apparent from the following detailed description thereof.

DESCRIPTION OF THE PREFERRED EMBODIMENTS

An important aspect of the present invention resides in the addition to a molten base glass of a highly soluble colorant oxide mixture either in the melting tank or by the forehearth procedure. As the base glass, flint glasses may be used. Representative flint glasses are illustrated by the composition set forth below. Generally the glasses falling within the broad compositional ranges are soda-lime-silica flint glasses. Decolorizers are usually incorporated in these compositions since they are commonly employed for the manufacture of colorless containers such as milk bottles and the like.

| Constituent | Percent by Weight |
|---|---|
| SiO$_2$ | 60–75 |
| Al$_2$O$_3$ | 0.3–14 |
| CaO & MgO | 6–15 |
| Na$_2$O | 7–18 |
| K$_2$O | 0–5 |
| BaO | 0–5 |
| Decolorizer | Trace |

The purpose of the decolorizer is to mask the undesirable coloration imparted to the glasses by iron impurities. Selenium is most often used for this purpose in the amount of 0.00025 to 0.00035%. However for purposes of this invention, decolorizers need not be present.

The following specific examples are theoretical soda-lime-flint glasses into which the colorant oxide mixture of the present invention may be incorporated to produce composite glasses of the Champagne coloration.

| Specific base glass number 1 | |
|---|---|
| SiO$_2$ | 72.01 |
| Al$_2$O$_3$ | 1.74 |
| Fe$_2$O$_3$ | .039 |
| TiO$_2$ | .029 |
| CaO | 11.38 |
| MgO | 1.15 |
| R$_2$O (Na$_2$O+K$_2$O) | 13.65 |
| Decolorizer | Trace |
| (Illustratively the decolorizer may be selenium in the amount of .00025 to .00030%.) | |

The colorant oxide material can be added in the form of potassium dichromate (K$_2$Cr$_2$O$_7$), the cobalt oxide is added as chemically pure cobalt oxide and the manganese component is added in the form of manganese ore, namely, pyrolusite, which is MnO$_2$. A typical chemical analysis of the composite glass shows that the chrome is present as Cr$_2$O$_3$ in the amount of 0.075% and the total manganese as MnO is present in the amount of 0.019% and the cobalt oxide is present as CoO in the amount of 0.0087%.

Illustrative batch ingredients are Rockwood sand, soda ash, H. C. Lime, Spruce Pine Feldspar, salt cake, potassium dichromate, black cobalt oxide and manganese ore (Morrocan A).

In the production of glass containers of a wide variety, the base glass is prepared in a melting tank of several hundred tons capacity. The batch ingredients, which may be the usual glass-forming batch ingredients, are added at one end of the melting zone and after fusion, the melt flows to the fining zone. The molten glass is issued out of the fining zone by being run through one or more of the forehearths. Each forehearth feeds a container manufacturing machine. In the forehearth colorant process, a frit is metered into the molten glass at a point where the glass flows from the fining zone into the forehearth. This may be done by a suitable vibration feeder and hopper apparatus as is known in the art.

Refractory stirrers are used to mix the colorant into the glass and to produce uniformly homogenized color all through the glass so that ware of even color throughout will be produced. The forehearth procedures which may be used in accordance with the present invention are shown in U.S. Pat. No. 3,024,121.

Generally the melting and fining zones of glass melting furnaces are maintained at substantially higher temperatures than the forehearth. Thus melting and fining temperatures in the range of 2750°–2950° F. are common. These high temperatures cause bubbles of occluded gas to be driven out of the melt and this prevents seeds from being formed in the finished ware.

Temperatures in the forehearth must be reduced substantially to the forming temperature of the glass so that the glass will be sufficiently viscous to form properly in the container blowing machine. If it is too hot, the viscosity will be too low to form a proper gob and this will prevent formation of a properly blown container. Forehearth temperatures are generally in the range of 2350°F. down to the forming temperature of the glass of about 1900° to 2000° F.

When the colorant oxides are added in the forehearth, it is desirable that they be added in the form of a finely divided powder. Within the broad scope of the invention, mesh sizes in the range of −8 to 400 can be employed. However, the mesh sizes of +50 to +200 mesh are generally preferred. High melting refractory type impurities should not be present in the oxide mixture.

In accordance with the present invention, the rates of addition of the colorant oxides will in the broad range be from about 0.03% to 0.15% Cr$_2$O$_3$, 0.01% to 0.04% MnO and 0.005 to 0.015% CoO by weight based on the total composite glass. A more particular or preferred range is from 0.065% to 0.075% Cr$_2$O$_3$, from 0.015% to 0.025% MnO and from 0.006% to 0.012% CoO.

The following examples are illustrative of the present invention.

In the following examples the weight ratio of Cr$_2$O$_3$ to MnO ranges from 2 to 5.55. The weight ratio of (Cr$_2$O$_3$+MnO) to CoO ranges from about 8.7 to about 11.1.

EXAMPLE 1

The following batch was prepared:

| | |
|---|---|
| Rockwood Sand | 330.7 lbs. |
| Soda Ash | 114.1 |
| H. C. Lime | 98.9 |
| Spruce Pine Feldspar | 52.2 |
| Salt Cake | 3.14 |
| Potassium Dichromate | .699 |
| Black Cobalt Oxide | .052 |
| Manganese Ore Morrocan A | .260 |

The glass produced therefrom had the following theoretical analysis:

| | |
|---|---|
| SiO$_2$ | 71.72% |
| Al$_2$O$_3$ | 1.98 |
| Fe$_2$O$_3$ | .019 |
| CaO | 11.30 |
| MgO | .24 |
| Na$_2$O | 14.00 |
| K$_2$O | .52 |
| Cr$_2$O$_3$ | .072 |
| MnO | .036 |
| CoO | .0097 |

The C.I.E. properties were, as follows at 10 mm of glass thickness:

| | |
|---|---|
| DWL (m$\mu$) | 568.22 |
| Purity (%) | 54.82 |
| Brightness (%) | 3.90 |

EXAMPLE 2

Another batch was prepared comprising the following ingredients:

| | |
|---|---|
| Rockwood Sand | 330.7 lbs. |
| Soda Ash | 114.1 |
| H. C. Lime | 98.9 |
| Spruce Pine Feldspar | 52.2 |
| Salt Cake | 3.14 |
| Potassium Dichromate | .595 |
| Balck Cobalt Oxide | .044 |
| Manganese Ore-Morrocan A | .166 |

The resulting glass had the following C.I.E. properties at 10 mm of glass thickness:

| | |
|---|---|
| DWL (m$\mu$) | 566.0 |
| Purity (%) | 45.1 |
| Brightness (%) | 11.8 |

EXAMPLE 3

Another sample of glass was prepared from the same basic batch composition as in Example 1 except that the colorants were, as follows:

| | |
|---|---|
| $Cr_2O_3$ | .072% |
| CoO | .0082% |
| MnO | .0173% |

The C.I.E. properties measured at 10 mm of glass thickness were, as follows:

| | |
|---|---|
| DWL (m$\mu$) | 565.2 |
| Purity (%) | 54.0 |
| Brightness (%) | 10.77 |

EXAMPLE 4

Using the same basic batch composition as in Example 1, the colorant composition was changed and a glass was prepared. The colorant composition in this example was, as follows:

| | |
|---|---|
| $Cr_2O_3$ | .0614% |
| CoO | .0082% |
| MnO | .023% |

The C.I.E. properties for 10 mm glass thickness were, as follows:

| | |
|---|---|
| DWL (m$\mu$) | 566 |
| Purity (%) | 45.1 |
| Brightness (%) | 11.74 |

EXAMPLE 5

With the same batch composition as in Example 1, the colorants were changed, as follows:

| | |
|---|---|
| $Cr_2O_3$ | 0.072% |
| MnO | 0.0130% |
| CoO | 0.0097% |

The glass was measured for C.I.E. data at 10 mm glass thickness and the following values were obtained:

| | |
|---|---|
| DWL (m$\mu$) | 561.5 |
| Purity (%) | 49.5 |
| Brightness (%) | 13.36 |

EXAMPLE 6

Using the same batch as in Example 1, the colorants were changed, as follows:

| | |
|---|---|
| $Cr_2O_3$ | 0.072% |
| MnO | 0.036% |
| CoO | 0.0097% |

The C.I.E. data for 10 mm thickness of this glass were, as follows:

| | |
|---|---|
| DWL (m$\mu$) | 568.5 |
| Purity (%) | 47.8 |
| Brightness (%) | 3.42 |

From the foregoing examples, it will be apparent that the specified glasses exemplified have C.I.E. characteristics, as determined for ten millimeter (10 mm) thickness, falling within the following ranges:

| | |
|---|---|
| DWL (m$\mu$) | 561. to 568.5 |
| Purity (%) | 45 to 54.82 |
| Brightness (%) | 3.42 to 13.36 |

More generally, the glasses of this invention possess C.I.E. characteristics, as determined for ten millimeter (10 mm) thickness, falling within the following ranges:

| | |
|---|---|
| DWL (m$\mu$) | 560 – 570 |
| Purity (%) | 40 – 58 |
| Brightness (%) | 3 – 15 |

Beverage containers of all sizes and shapes may be formed from the Champagne Green glasses of this invention. The resulting containers have a pleasing coloration and serve to protect the contents from ultraviolet light and thereby prevent deterioration of color, taste and appeal of the beverage.

I claim:

1. A method of making a Champagne Green colored glass which comprises adding to a colorless flint glass in the forehearth a mixture of colorant oxides consisting of 0.03% to 0.15% $Cr_2O_3$, 0.01% to 0.04% MnO and 0.005% to 0.015% CoO based on the weight of the composite glass, whereby the composite glass has C.I.E. characteristics for a ten millimeter thickness falling within the following ranges:

| | |
|---|---|
| DWL (m$\mu$) | 560–570 |
| Purity (%) | 40–58 |
| Brightness (%) | 3–15. |

2. A method defined in claim 1 wherein the composite glass has a C.I.E. characteristic for a ten millimeter thickness falling within the following range:

| | |
|---|---|
| DWL (m$\mu$) | 561.5–568.5 |
| Purity (%) | 45–54.82 |
| Brightness (%) | 3.42–13.36 | and wherein the mixture of colorant oxides consists of 0.065% to 0.075% $Cr_2O_3$, 0.015% to 0.025% MnO and 0.006% to 0.012% CoO.

3. A Champagne Green colored glass container formed of a flint glass having present as colorant ingredients a mixture consisting of 0.03% to 0.15% $Cr_2O_3$, 0.01% to 0.04% MnO and 0.005% to 0.015% CoO, whereby the glass container has the following C.I.E. characteristics measured through 10 mm glass thickness:

| | |
|---|---|
| DWL (m$\mu$) | 560–570 |
| Purity (%) | 40–58 |
| Brightness (%) | 3–15. |

4. A colored glass container as defined in claim 3, wherein the colorant ingredients consist of 0.065% to 0.075% $Cr_2O_3$, 0.015% to 0.025% MnO and 0.006% to 0.012% CoO, and which has the following C.I.E. characteristic measured through 10 mm glass thickness:

| | |
|---|---|
| DWL (m$\mu$) | 561.5–568.5 |
| Purity (%) | 45–54.82 |
| Brightness (%) | 3.42–13.36. |

* * * * *